(12) United States Patent
Chan et al.

(10) Patent No.: US 7,443,701 B2
(45) Date of Patent: Oct. 28, 2008

(54) DOUBLE-ENDED CONVERTER

(75) Inventors: Chun-Kong Chan, Hsi Chih (TW); Jeng-Shong Wang, Hsin Chuang (TW)

(73) Assignee: Lien Chang Electronic Enterprise Co., Ltd., Taipei County (TW)

( * ) Notice: Subject to any disclaimer, the term of this patent is extended or adjusted under 35 U.S.C. 154(b) by 277 days.

(21) Appl. No.: 11/514,866

(22) Filed: Sep. 5, 2006

(65) Prior Publication Data
US 2008/0055945 A1 Mar. 6, 2008

(51) Int. Cl.
*H02M 3/335* (2006.01)
(52) U.S. Cl. .................. 363/26; 315/307; 315/247
(58) Field of Classification Search .................. 363/22, 363/23, 24; 315/247, 307
See application file for complete search history.

(56) References Cited
U.S. PATENT DOCUMENTS

| | | | | |
|---|---|---|---|---|
| 4,742,535 A | * | 5/1988 | Hino et al. | 378/105 |
| 5,414,609 A | * | 5/1995 | Levran et al. | 363/17 |
| 6,259,615 B1 | * | 7/2001 | Lin | 363/98 |
| 6,804,129 B2 | * | 10/2004 | Lin | 363/98 |
| 7,394,209 B2 | * | 7/2008 | Lin et al. | 315/247 |

\* cited by examiner

*Primary Examiner*—Shawn Riley
(74) *Attorney, Agent, or Firm*—Rosenberg, Klein & Lee

(57) ABSTRACT

A full bridge inverter includes a push/pull control chip outputting a first control signal and a second control signal. Each duty cycle of the two control signals is smaller than 50%. Moreover, both a first driver and a second driver are coupled to the push/pull control chip and a DC power. A full bridge switch assembly with four N-MOSes couples to the DC power, the first driver, the second driver and a transformer, and converts the DC power into an AC power by the first driver and the second driver. The AC power is transmitted to a first side of the transformer.

22 Claims, 9 Drawing Sheets

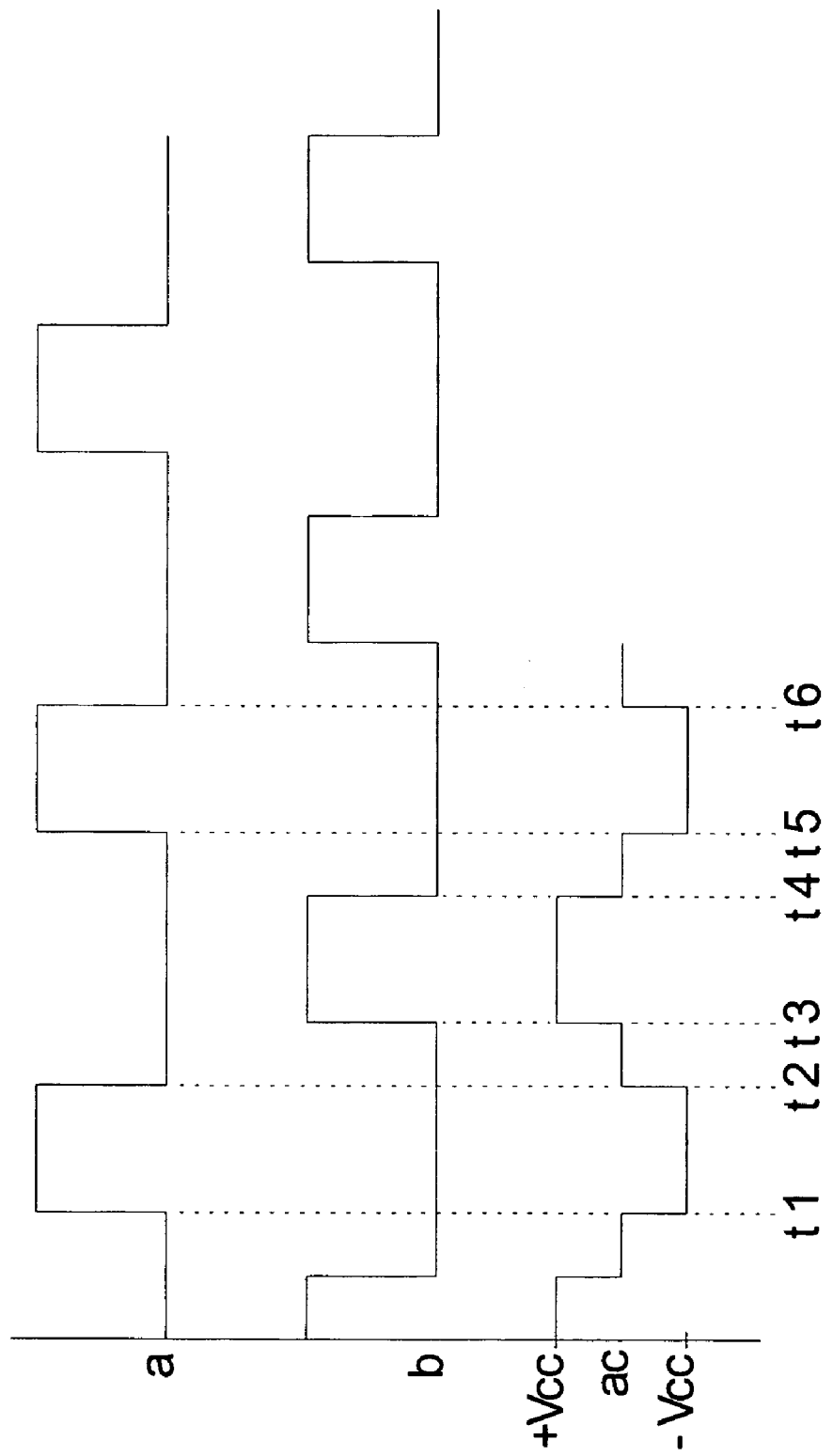

DOUBLE-ENDED CONVERTER

BACKGROUND OF THE INVENTION

1. Field of the Invention

The present invention relates to a full bridge inverter and, more particularly, to a full bridge inverter controlled by a push/pull control chip to drive a load.

2. Description of Related Art

The power supply for a backlight source of a TFT LCD panel makes use of an inverter circuit to accomplish energy conversion and turn a cold cathode fluorescent lamp (CCFL) on. Conventional inverter circuits can be divided into half bridge-type, full-bridge type and push/pull-type according to different circuit topologies. An inverter circuit is a circuit for converting DC power into AC power.

As shown in FIG. 1, a transformer T1 divides the circuit into a front-end circuit at the first side 101 and a rear-end circuit at the second side 102. The front-end circuit at the first side 101 comprises a DC voltage source Vcc, a first switch Q1, and a second switch Q2. The rear-end circuit at the second side 102 comprises at least a capacitor (C1, C2, C3), a load, and at least a diode (D1, D2). A push/pull control chip 103 is connected between the front-end circuit at the first side 101 and the rear-end circuit at the second side 102.

Reference is also made to FIG. 2 as well as FIG. 1. The push/pull control chip 103 outputs a first control signal a and a second control signal b to turn switching actions of the two switches Q1 and Q2 at the first side 101, respectively. A DC power Vcc is used to provide energy, and the transformer T1 raises and converts the voltage of DC power Vcc to the rear-end circuit 102 for driving the load. The output voltage waveform c at the second side of the transformer T1 is the voltage waveform at point C. As shown in FIG. 2, the output voltage waveform c at the second side is an AC voltage waveform.

In the above description, the push/pull control chip 103 can be the LX1686, LX1688 or LX1691 push/pull control chip produced by Linfinity (Microsemi) Corporation, or the 02-9RR, 0Z9930, 0Z9938 or 0Z9939 push/pull control chip produced by O2 Micro International Limited, or the TL-494 or TL-595 push/pull control chip produced by TEXAS INSTRUMENT, or the BIT3193, BIT3713, BIT3715 or BIT3501 push/pull control chip produced by Beyond Innovation Technology.

As shown in FIG. 3, a transformer T2 divides the circuit into a front-end circuit at the first side 201 and a rear-end circuit at the second side 202. The front-end circuit at the first side 201 comprises four electronic switches (P1, P2, N1, N2), a full bridge control chip 203 and a capacitor C1. Moreover the rear-end circuit at the second side 202 comprises a load.

Referring to FIG. 4, the full bridge control chip 203 transmits four control signals (POUT1, POUT2, NOUT1, NOUT2) to the four electronic switches (P1, P2, N1, N2), respectively; by switching those switches, power is supplied to the load through the transformer T2 according to the DC power. The full bridge control chip 203 is the BIT3105 of the Beyond Innovation Technology Corp or the OZ960, OZ964, OZ9925, OZ9910, OZL68, OZ9938 or OZ9939 of the O2-MICRO Corp.

In the above description, driving the full bridge switch assembly requires the full bridge control chip 203 and driving the push/pull inverter requires the push/pull control chip 103, thus lacking practical flexibility. Furthermore, the control chip of the inverter circuit is limited in use so as to be hard to purchase together.

SUMMARY OF THE INVENTION

Accordingly, the primary object of the present invention uses two similar drivers to connect the two output terminals of the push/pull control chip separately and the gates of the full bridge switch assembly composed of four N-MOSes. The two similar drivers are controlled by the push/pull control chip to drive the switching actions of the full bridge switch assembly.

The full bridge inverter of the present invention connected to the two terminals of a first side of a transformer and converting a DC power to an AC power. The full bridge inverter comprises a push/pull control chip, a first switch, a first SCR switch, a first N-MOS, a second N-MOS, a second switch, a second SCR switch, a third N-MOS, and a fourth N-MOS.

The push/pull control chip has a first output terminal and a second output terminal, the first and second output terminals separately output a first control signal and a second control signal both with a duty cycle smaller than 50%. The first switch couples to the first output terminal of the push/pull control chip via a first buffer circuit. The first SCR switch has a gate coupling to the first switch and an anode coupling to the DC power. The first N-MOS has a gate coupling to a cathode of the first SCR switch and a drain coupling to the DC power and a source coupling to one terminal of the first side of the transformer. The second N-MOS has a gate coupling to the first output terminal of the push/pull control chip via the first buffer circuit and a drain coupling to the source of the first N-MOS and a source coupling to a reference terminal. In the mention of the above, the first switch, the first buffer circuit and the first SCR switch are formed to be a first driver.

Moreover, The second switch couples to the second output terminal of the push/pull control chip via a second buffer circuit. The second SCR switch has a gate coupling to the second switch and an anode coupling to the DC power. The third N-MOS has a gate coupling to a cathode of the second SCR switch and a drain coupling to the DC power and a source coupling to another terminal of the first side of the transformer. The fourth N-MOS has a gate coupling to the second output terminal of the push/pull control chip via the second buffer circuit and a drain coupling to the source of the third N-MOS and a source coupling to the reference terminal. In the mention of the above, the second switch, the second buffer circuit and the second SCR switch are formed to be a first driver.

The full bridge inverter of the present invention uses two drivers in the conventional full bridge inverter circuit to match a push/pull control chip for control. The present invention has higher flexibility in practical use, and won't be limited by the control chip. Moreover, manufacturers only need to use push/pull control chips to drive and control push/pull inverter circuits or full bridge inverter circuits.

BRIEF DESCRIPTION OF THE DRAWINGS

The various objects and advantages of the present invention will be more readily understood from the following detailed description when read in conjunction with the appended drawing, in which:

FIG. 9 is a waveform diagram of the output signals of the push/pull control chip and the AC power voltage of the present invention.

DETAILED DESCRIPTION OF THE PREFERRED EMBODIMENTS

Figure 1:
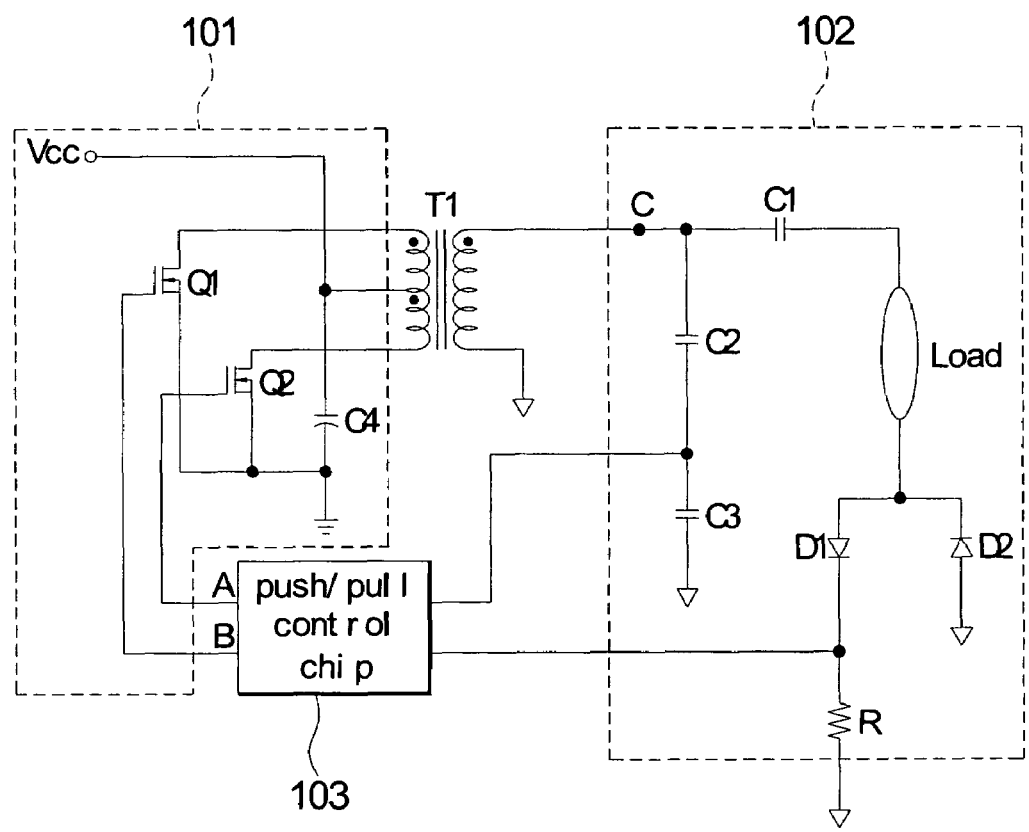
FIG. 1 is a circuit schematic diagram of a prior art push/pull inverter driving the load.
Figure 2:
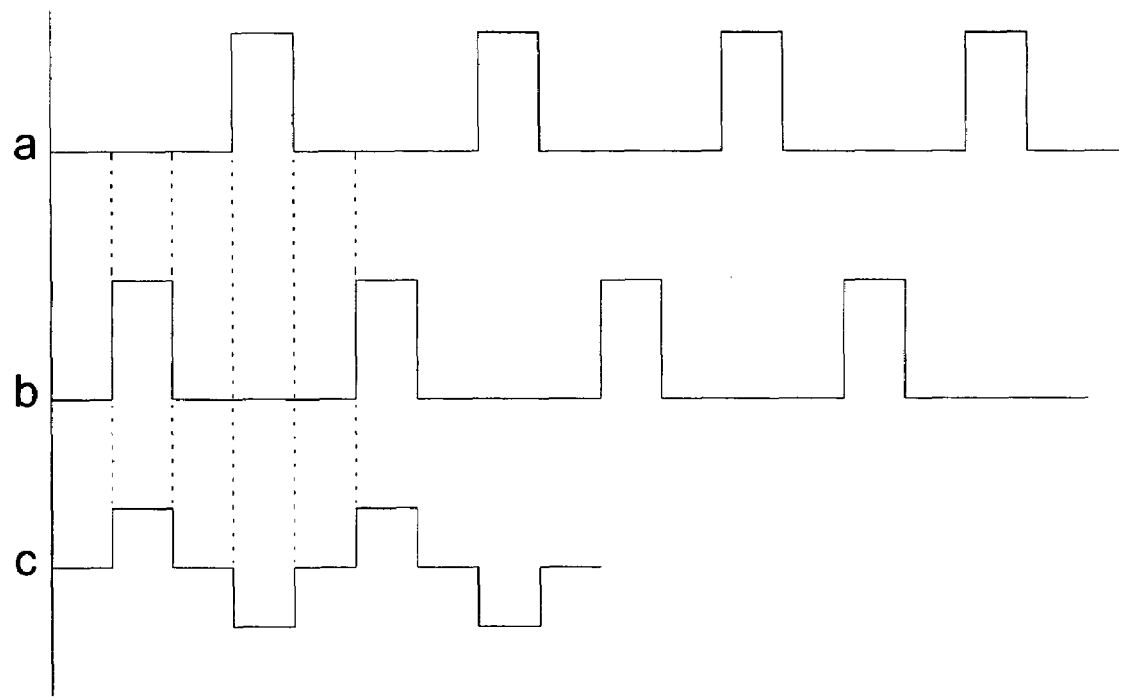
FIG. 2 is a wave schematic diagram of control signals of the push/pull control chip and the output voltage of the load.
Figure 3:
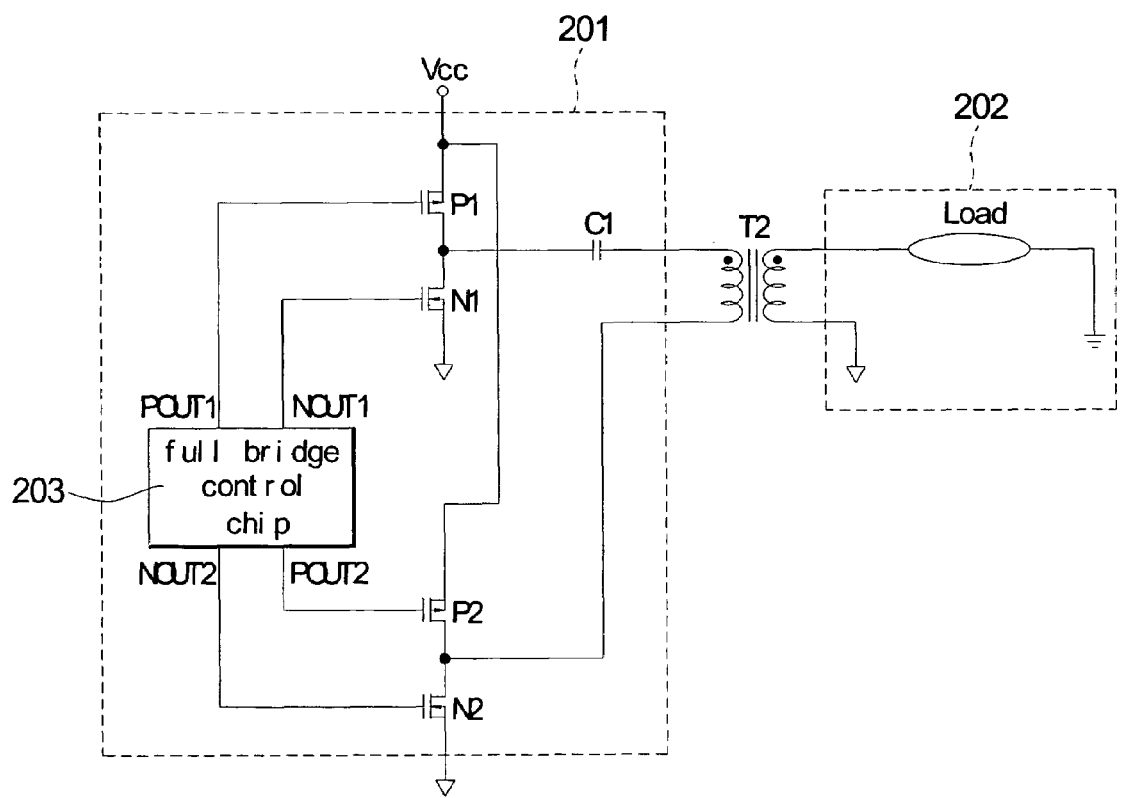
FIG. 3 is a circuit schematic diagram of a prior art full bridge inverter driving the load.
Figure 4:
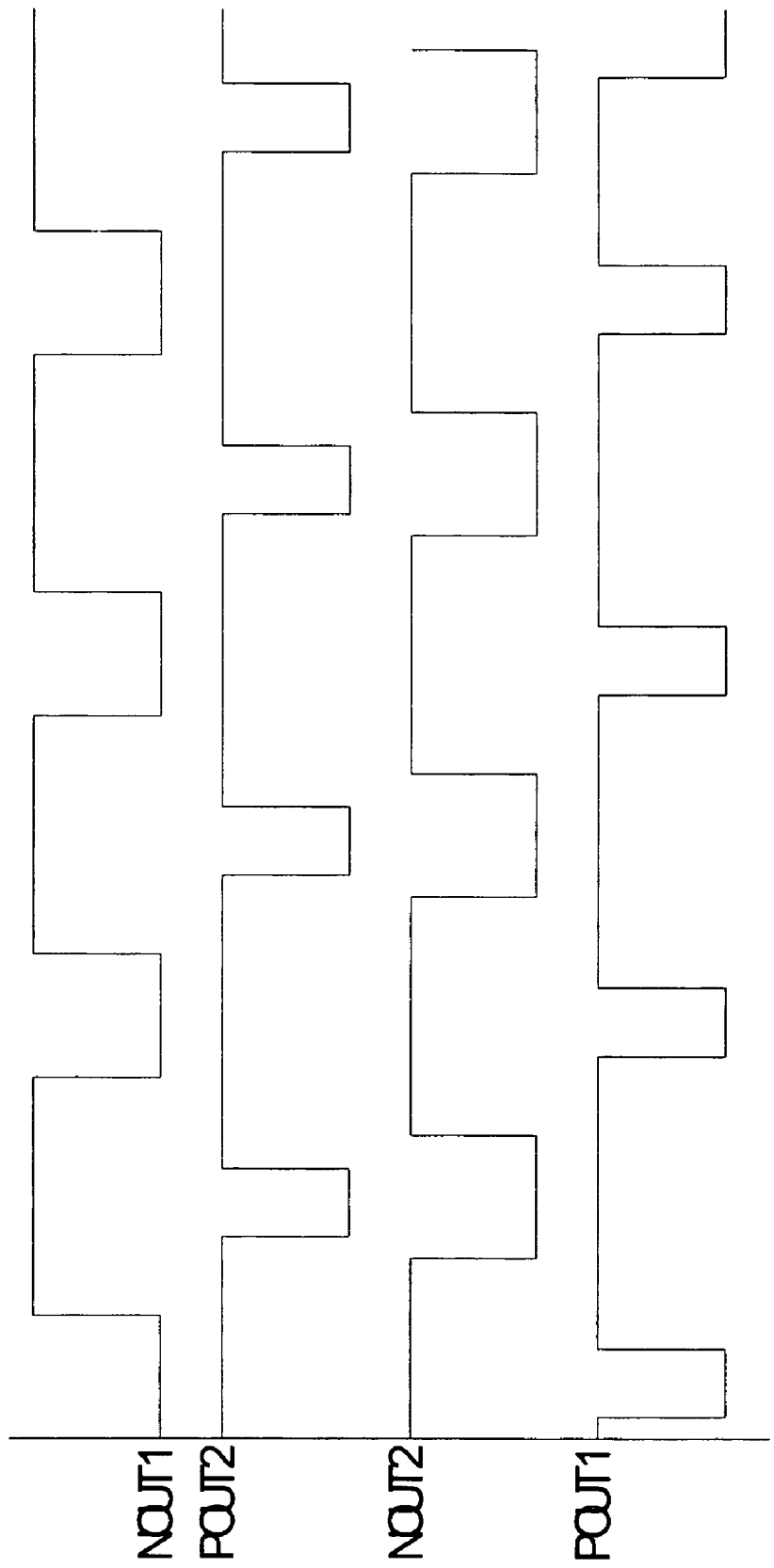
FIG. 4 is a wave schematic diagram of control signals of a prior art full bridge inverter.
Figure 5:
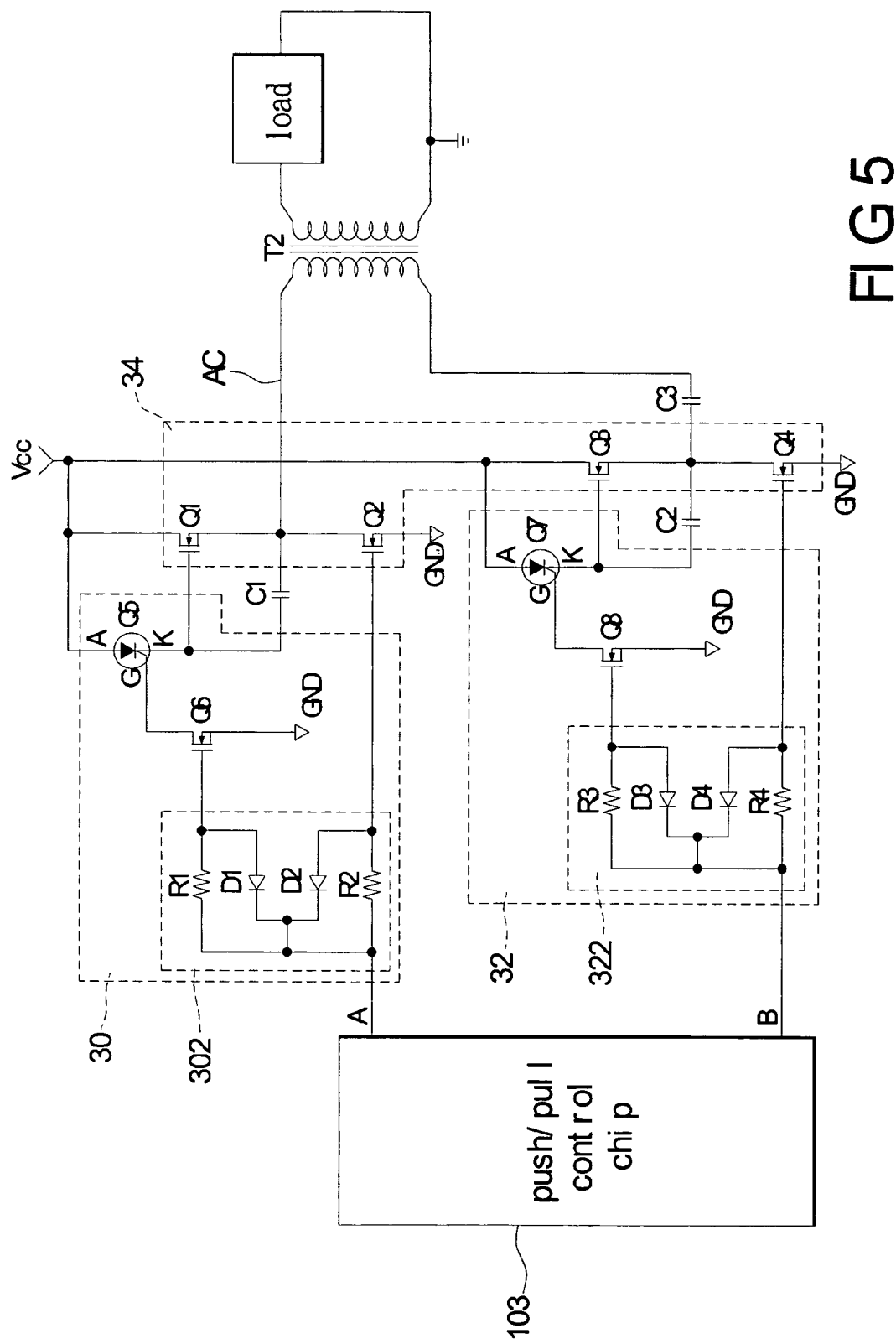
FIG. 5 is a circuit diagram of the full bridge inverter according to a first embodiment of the present invention.

As shown in FIG. 5, a full bridge inverter according to the first embodiment of the present invention is connected to a first side of a transformer T2 to convert a DC power Vcc to an AC power. The AC power provides electric energy required by the load via the transformer T2.

Reference is made to FIG. 5 again. The full bridge inverter according to the first embodiment of the present invention comprises a push/pull control chip 103, a first driver 30, a second driver 32, and a full bridge switch assembly 34. The push/pull control chip 103 has a first output terminal A and a second output terminal B. The first output terminal A and the second output terminal B output a first control signal a and a second control signal b both with a duty cycle smaller than 50%, respectively.

The first driver 30 couples to the first output terminal A of the push/pull control chip 103 and the DC power Vcc for receiving the first control signal a. The second driver 32 couples to the second output terminal B of the push/pull control chip 103 and the DC power Vcc for receiving the second control signal b. The full bridge switch assembly 34 is composed of four N-MOSes. The full bridge switch assembly 34 couples to the DC power Vcc, the first driver 30, the second driver 32 and the transformer T2. The full bridge switch assembly 34 is controlled by the first driver 30 and the second driver 32 to convert the DC power Vcc to the AC power. The AC power is transmitted to the first side of the transformer T2.

Reference is made to FIG. 5 again. The first driver 30 comprises a first buffer circuit 302, a first switch Q6 and a first SCR switch Q5. The first buffer circuit 302 couples to the first output terminal A of the push/pull control chip 103 and a second N-MOS Q2 of the full bridge switch assembly 34. The first switch Q6 couples to the first output terminal A of the push/pull control chip 103 via the first buffer circuit 302. The first SCR switch Q5 has a gate coupling to the first switch Q6 and an anode coupling to the DC power Vcc and a cathode coupling to a first N-MOS Q1 of the full bridge switch assembly 34.

Furthermore, the circuit of the second driver 32 is the same with the first driver 30 mentioned above. As shown in FIG. 5, the second driver 32 comprises a second buffer circuit 322, a second switch Q8 and a second SCR switch Q7. The second buffer circuit 322 couples to the second output terminal B of the push/pull control chip 103 and a fourth N-MOS Q4 of the full bridge switch assembly 34. The second switch Q8 couples to the second output terminal B of the push/pull control chip 103 via the second buffer circuit 322. The second SCR switch Q7 has a gate coupling to the second switch Q8 and an anode coupling to the DC power Vcc and a cathode coupling to a third N-MOS Q3 of the full bridge switch assembly 34.

Reference is made to FIG. 5 again. The gate of the first N-MOS Q1 couples to the cathode (K) of the first SCR switch Q5. The drain of the first N-MOS Q1 couples to the DC power Vcc. The source of the first N-MOS Q1 couples to one terminal of the first side of the transformer T2. The gate of the second N-MOS Q2 couples to the first output terminal A of the push/pull control chip 103 via the first buffer circuit 302. The drain of the second N-MOS Q2 couples to the source of the first N-MOS Q1. The source of the second N-MOS Q2 couples to a reference terminal GND. The gate of the third N-MOS Q3 couples to the cathode (K) of the second SCR switch Q7. The drain of the third N-MOS Q3 couples to the DC power Vcc. The source of the third N-MOS Q3 couples to another terminal of the first side of the transformer T2. The gate of the fourth N-MOS Q4 couples to the second output terminal B of the push/pull control chip 103 via the second buffer circuit 322. The drain of the fourth N-MOS Q4 couples to the source of the third N-MOS Q3. The source of the fourth N-MOS Q4 couples to the reference terminal GND.

In the above description, the DC power Vcc provides a positive DC power +Vcc for the transformer T2 through conduction of the first N-MOS Q1 and the fourth N-MOS Q4 to form a positive half-cycle of driving, or provides a negative DC power −Vcc for the transformer T2 through conduction of the second N-MOS Q2 and the third N-MOS Q3 to form a negative half-cycle of driving.

Reference is made to FIG. 5 again. The first buffer circuit 302 coupled to the first switch Q6 comprises a first accelerating diode D1, a first resistor R1, a second accelerating diode D2 and a second resistor R2. The negative terminal (N) of the first accelerating diode D1 couples to the first output terminal A of the push/pull control chip 103. The positive terminal (P) of the first accelerating diode D1 couples to the first switch Q6. The first resistor R1 parallel couples to the first accelerating diode D1. Moreover, the negative terminal (N) of the second accelerating diode D2 couples to the first output terminal A of the push/pull control chip 103. The positive terminal (P) of the second accelerating diode D2 couples to the gate of the second N-MOS Q2. The second resistor R2 parallel couples to the second accelerating diode D2.

Furthermore, the second buffer circuit 322 coupled to the second switch Q8 comprises a third accelerating diode D3, a third resistor R3, a fourth accelerating diode D4 and a fourth resistor R4. The negative terminal (N) of the third accelerating diode D3 couples to the second output terminal B of the push/pull control chip 103. The positive terminal (P) of the third accelerating diode D3 couples to the second switch Q8. The third resistor R3 parallel couples to the third accelerating diode D3. Moreover, the negative terminal (N) of the fourth accelerating diode D4 couples to the second output terminal B of the push/pull control chip 103. The positive terminal (P) of the fourth accelerating diode D4 couples to the gate of the fourth N-MOS Q4. The fourth resistor R4 parallel couples to the fourth accelerating diode D4.

Reference is made to FIG. 5 again. The full bridge inverter of the present invention further comprises a first capacitor C1 and a second capacitor C2. The capacitor C1 is coupled between the gate and source of the first N-MOS Q1. The capacitor C2 is coupled between the gate and source of the third N-MOS Q3. The capacitor C1 and the capacitor C2 can be added in the circuit in consideration of the requirement of circuit characteristics. In circuit design, the capacitor C1 can be replaced with a parasitic capacitor $C_{GS}$ between the gate and source of the first N-MOS Q1, moreover, the capacitor C2 can be replaced with a parasitic capacitor $C_{GS}$ between the gate and source of the third N-MOS Q3.

Reference is made to FIG. 9 as well as FIG. 5. The push/pull control chip 103 can be the LX1686, LX1688 or LX1691 push/pull control chip produced by Linfinity (Microsemi)

Corporation, or the 02-9RR, 0Z9930, 0Z9938 or 0Z9939 push/pull control chip produced by O2 Micro International Limited, or the TL-494 or TL594 push/pull control chip produced by TEXAS INSTRUMENT, or the BIT3193, BIT3713, BIT3715 or BIT3501 push/pull control chip produced by Beyond Innovation Technology. Because there are so many brands in the market, only those in common use are listed above.

As shown in FIG. 9, the output terminal A of the push/pull control chip 103 outputs the first control signal a, and the output terminal B of the push/pull control chip 103 outputs the first control signal b. A voltage waveform ac of the AC power can be obtained at the first side of the transformer T2.

Reference is made to FIG. 9 as well as FIG. 5 again. At time $t_1$ to $t_2$, the first control signal a is at the high level, while the second control signal b is at the low level. The first control signal a is transmitted to the gate of the second N-MOS Q2 and the first switch Q6 via the first buffer circuit 302 to turn on the second N-MOS Q2 and the first switch Q6. The first switch Q6 that is turned on couples the gate of the first SCR switch Q5 to the reference terminal GND to keep the first SCR switch Q5 off. The first SCR switch Q5 that is kept off lets the first N-MOS Q1 keep off.

Besides, the second control signal b at the low level is transmitted to the gate of the fourth N-MOS Q4 and the second switch Q8 via the second buffer circuit 322 to turn off the fourth N-MOS Q4 and the second switch Q8. The second switch Q8 that is kept off lets the second SCR switch Q7 be floating. At this time, the DC power Vcc will be between the anode (A) and the cathode (K) of the second SCR switch Q7 to turn on the second SCR switch Q7. Once the second SCR switch Q7 is turned on, the DC power Vcc will turn on the third N-MOS Q3.

Therefore, at time $t_1$ to $t_2$, the second N-MOS Q2 and the third N-MOS Q3 are on, while the first N-MOS Q1 and the fourth N-MOS Q4 is off. At this time, because the second N-MOS Q2 and the third N-MOS Q3 are on, the DC power Vcc can transmit energy to the first side of the transformer T2. The voltage waveform ac obtained at the first side of the transformer T2 is a negative DC power −Vcc.

Reference is made to FIG. 9 as well as FIG. 5 again. At time $t_2$ to $t_3$, the first control signal a drops from the high level to the low level, and the second control signal b still keeps at the low level. At this time, the first switch Q6 enters the off state through the acceleration of the first accelerating diode D1, and the second N-MOS Q2 enters the off state through the acceleration of the second accelerating diode D2. The first switch Q6 that is kept off lets the first SCR switch Q5 be floating. At this time, the DC power Vcc will be between the anode (A) and the cathode (K) of the first SCR switch Q5 to turn on the first SCR switch Q5. Once the first SCR switch Q5 is turned on, the DC power Vcc will turn on the first N-MOS Q1. Because the second control signal b still keeps at the low level, the third N-MOS Q3 is on, while the fourth N-MOS Q4 is off.

Therefore, at time $t_2$ to $t_3$, the first N-MOS Q1 and the third N-MOS Q3 are on, while the second N-MOS Q2 and the fourth N-MOS Q4 is off. In the above descriptions, both the first N-MOS Q1 and the third N-MOS Q3 are on, letting the first side of the transformer T2 be short-circuited. At this time, the voltage waveform ac obtained at the first side of the transformer T2 is at a zero potential.

Reference is made to FIG. 9 as well as FIG. 5 again. At time $t_3$ to $t_4$, the first control signal a still keeps at the low level, while the second control signal b rises from the low level to the high level. The second control signal b is transmitted to the gate of the fourth N-MOS Q4 and the second switch Q8 via the second buffer circuit 322 to turn on the fourth N-MOS Q4 and the second switch Q8. The second switch Q8 that is turned on couples the gate of the second SCR switch Q7 to the reference terminal GND to keep the second SCR switch Q7 off. The second SCR switch Q7 that is kept off lets the third N-MOS Q3 keep off. Because the first control signal a still keeps at the low level, the first N-MOS Q1 is on, while the second N-MOS Q2 is off.

At this time, because the first N-MOS Q1 and the fourth N-MOS Q4 are on, the DC power Vcc can transmit energy to the first side of the transformer T2. The voltage waveform ac obtained at the first side of the transformer T2 is a positive DC power +Vcc.

Reference is made to FIG. 9 as well as FIG. 5 again. At time $t_4$ to $t_5$, the first control signal a still keeps at the low level, and the second control signal b drops from the high level to the low level. At this time, the second switch Q8 enters the off state through the acceleration of the third accelerating diode D3, and the fourth N-MOS Q4 enters the off state through the acceleration of the fourth accelerating diode D4. The second switch Q8 that is kept off lets the second SCR switch Q7 be floating. At this time, the DC power Vcc will be between the anode (A) and the cathode (K) of the second SCR switch Q7 to turn on the second SCR switch Q7. Once the second SCR switch Q7 is turned on, the DC power Vcc will turn on the third N-MOS Q3. Because the first control signal a still keeps at the low level, the first N-MOS Q1 is on, while the second N-MOS Q2 is off. Therefore, at time $t_4$ to $t_5$, the first N-MOS Q1 and the third N-MOS Q3 are on, while the second N-MOS Q2 and the fourth N-MOS Q4 is off. In the above descriptions, both the first N-MOS Q1 and the third N-MOS Q3 are on, letting the first side of the transformer T2 be short-circuited. At this time, the voltage waveform ac obtained at the first side of the transformer T2 is at a zero potential.

Reference is made to FIG. 9 as well as FIG. 5 again. In the present invention, the circuit actions of the full bridge inverter and the voltage waveform ac obtained at the first side of the transformer T2 at time $t_5$ to $t_6$ repeat those at time $t_1$ to $t_2$. In this way, an AC power for providing energy is formed. At the same time, the transformer T2 boosts the AC power and then provides energy for the load from the second side.

Figure 6:
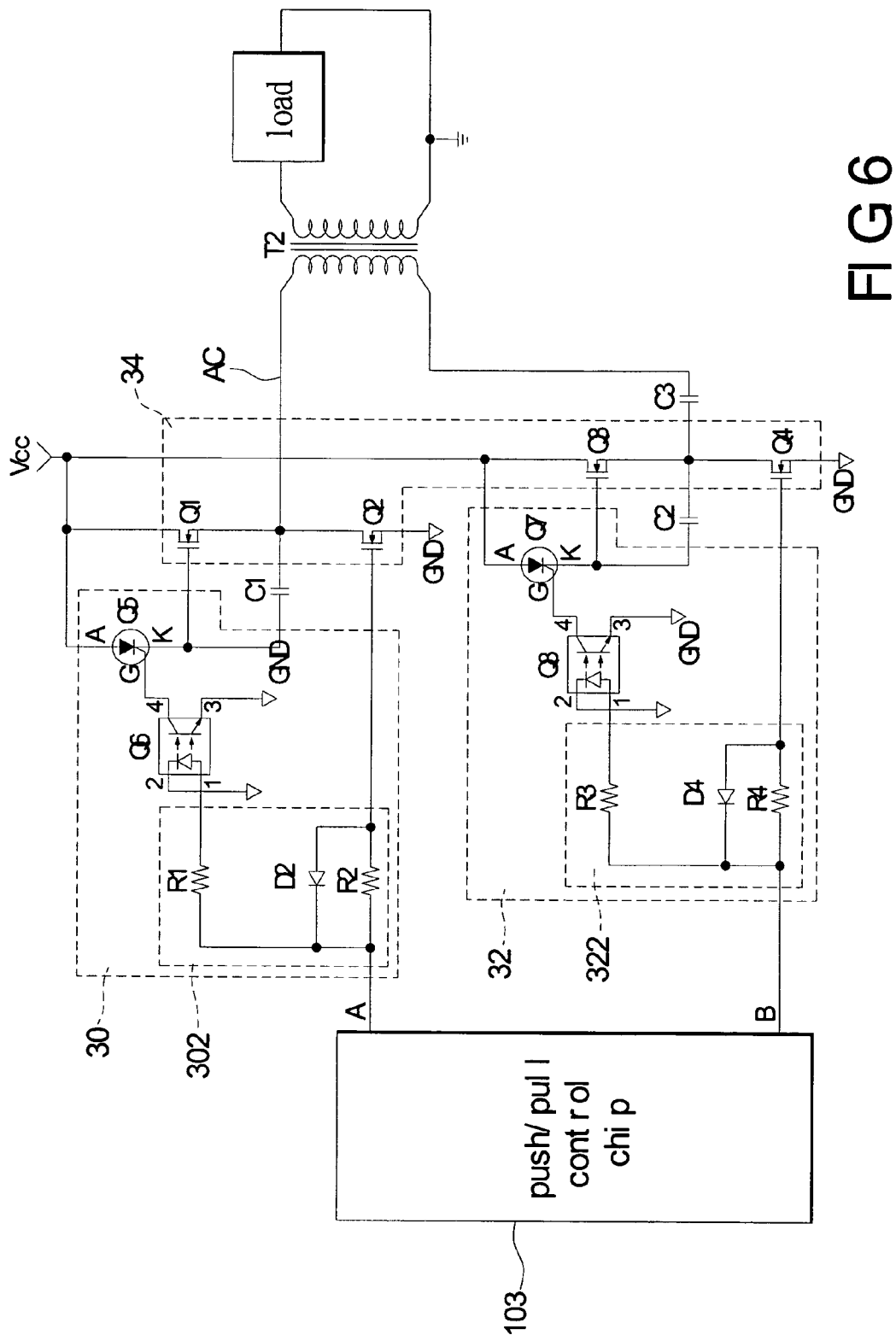
FIG. 6 is a circuit diagram of the full bridge inverter according to a second embodiment of the present invention.

Reference is made to FIG. 6 as well as FIG. 5. In this second embodiment, components identical to those used in the first embodiment are labeled with the same symbols. The circuit actions and achieved effects of this second embodiment are the same as those of the first embodiment. This second embodiment differs from the first embodiment only in that the first switch Q6 and the second switch Q8 in the first embodiment are replaced with light-coupled switches Q6, Q8 to protect the circuit components in the full bridge inverter through the characteristic of the light-coupled switches Q6, Q8. In this second embodiment, because using the light-coupled switches Q6, Q8 the first accelerating diode D1 of the first buffer circuit 302 and the third accelerating diode D3 of the second buffer circuit 322 have been taken for let the first resistor R1 couple to the light-coupled switch Q6 and the first output terminal A of the push/pull control chip 103 directly, and let the third resistor R3 couple to the light-coupled switch Q8 and the second output terminal B of the push/pull control chip 103 directly.

Figure 7:
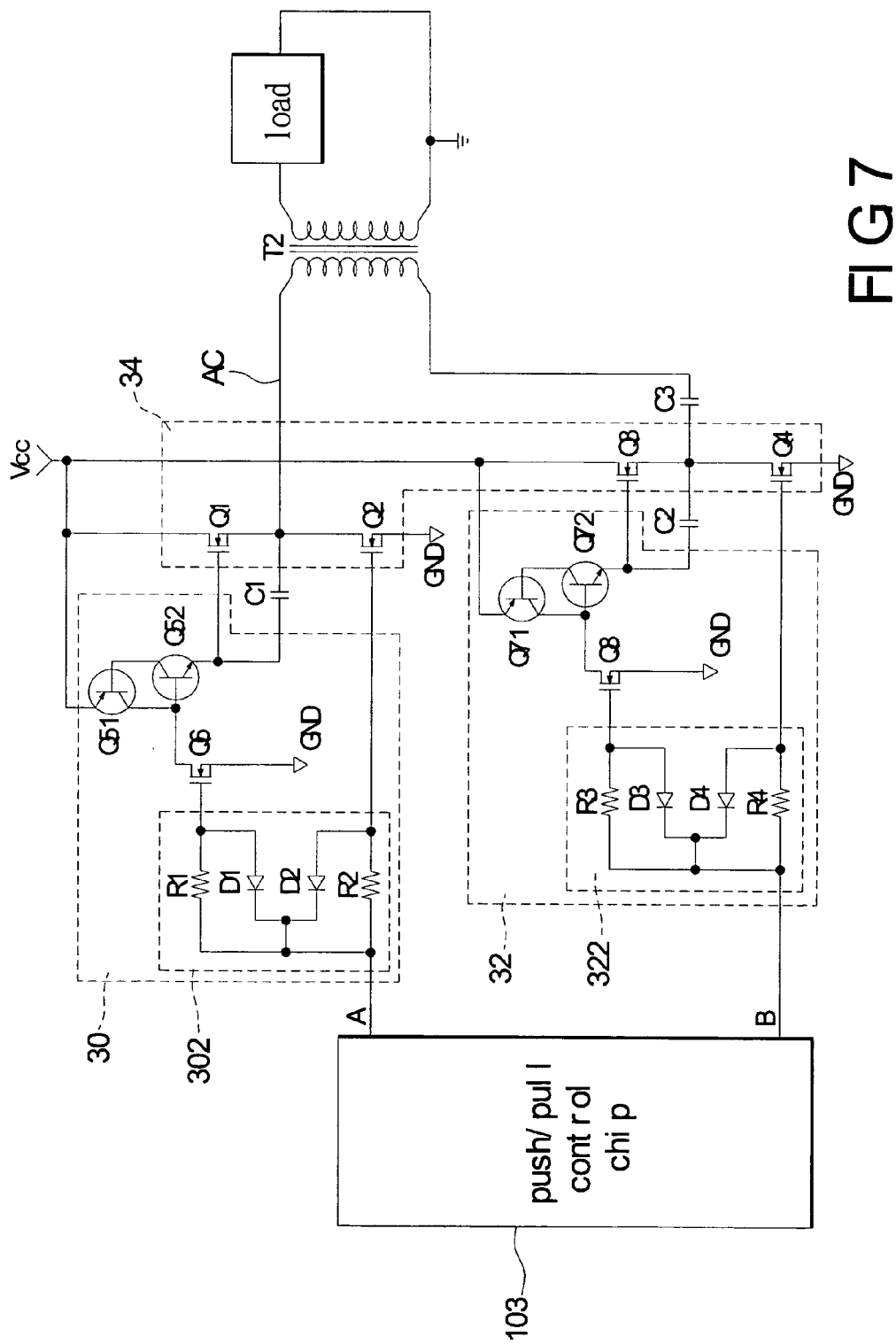
FIG. 7 is a circuit diagram of the full bridge inverter according to a third embodiment of the present invention.

Reference is made to FIG. 7 as well as FIG. 5. In this third embodiment, components identical to those used in the first embodiment are labeled with the same symbols. The circuit actions and achieved effects of this third embodiment are the same as those of the first embodiment. This third embodiment differs from the first embodiment only in that the first SCR switch Q5 in the first embodiment is effectively replaced with a pnp transistor Q51 and an npn transistor Q52 that are coupled together, and in that the second SCR switch Q7 in the first embodiment is effectively replaced with a pnp transistor Q71 and an npn transistor Q72 that are coupled together.

Figure 8:
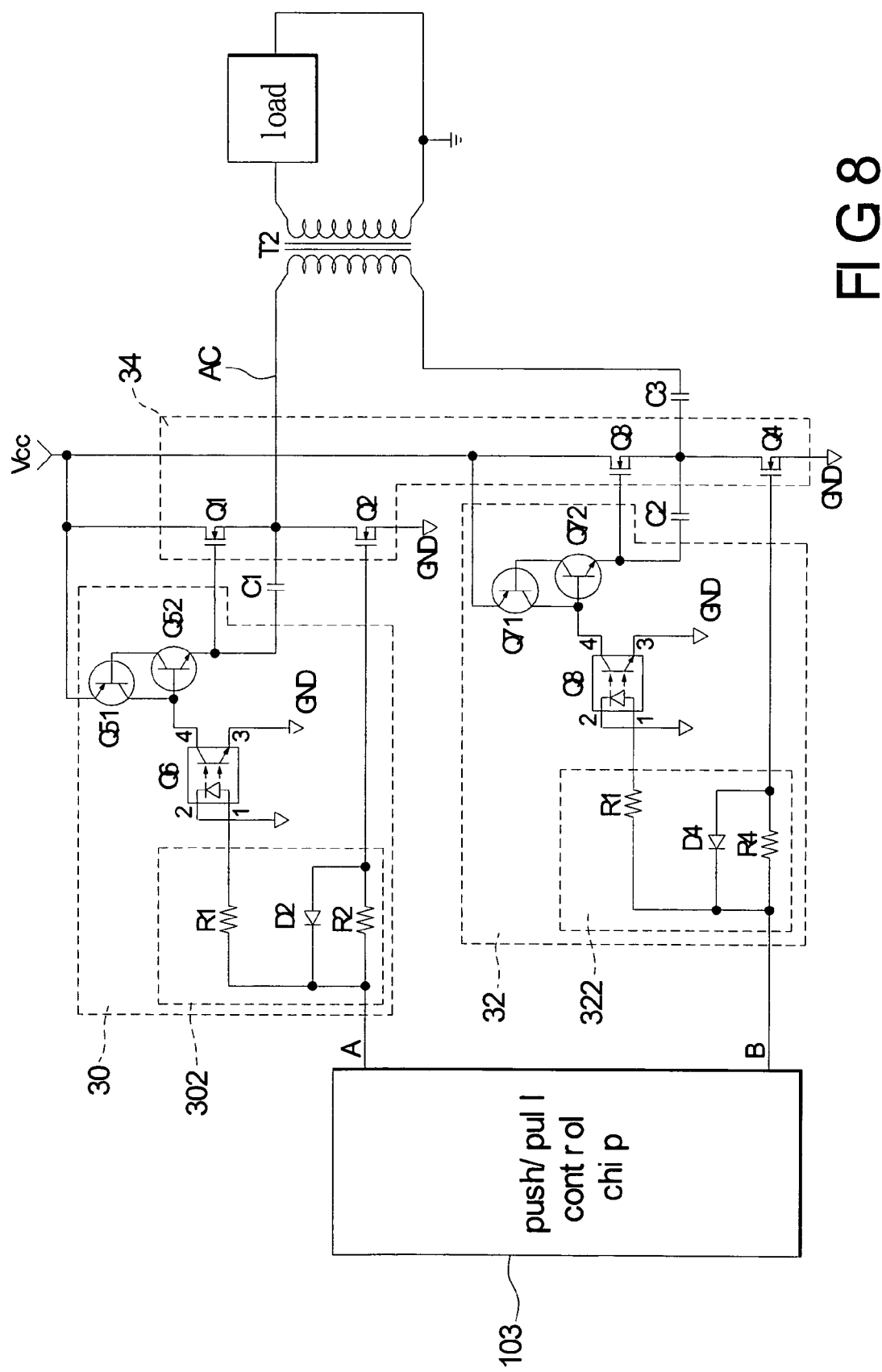
FIG. 8 is a circuit diagram of the full bridge inverter according to a fourth embodiment of the present invention.

Reference is made to FIG. 8 as well as FIG. 5. In this fourth embodiment, components identical to those used in the first embodiment are labeled with the same symbols. The circuit actions and achieved effects of this fourth embodiment are the same as those of the first embodiment. This fourth embodiment differs from the first embodiment as follows: the first switch Q6 and the second switch Q8 in the first embodiment are replaced with light-coupled switches Q6, Q8 to protect the circuit components in the full bridge inverter through the characteristic of the light-coupled switches Q6, Q8. In this fourth embodiment, because using the light-coupled switches Q6, Q8 the first accelerating diode D1 of the first buffer circuit 302 and the third accelerating diode D3 of the second buffer circuit 322 have been taken for let the first resistor R1 couple to the light-coupled switch Q6 and the first output terminal A of the push/pull control chip 103 directly, and let the third resistor R3 couple to the light-coupled switch Q8 and the second output terminal B of the push/pull control chip 103 directly.

Moreover, in this fourth embodiment, the first SCR switch Q5 in the first embodiment is effectively replaced with a pnp transistor Q51 and an npn transistor Q52 that are coupled together, and in that the second SCR switch Q7 in the first embodiment is effectively replaced with a pnp transistor Q71 and an npn transistor Q72 that are coupled together.

To sum up, the full bridge inverter of the present invention can connect the two driver 30, 32 to the conventional full bridge inverter circuit to match the push/pull control chip 103 for control, hence having higher flexibility in practical use and being not limited by the control chip. Moreover, manufacturers only need to use the push/pull control chip 103 to drive and control a push/pull inverter circuit or a full bridge inverter circuit.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

What is claimed is:

1. A full bridge inverter connected to a first side of a transformer and converting a DC power to an AC power, said full bridge inverter comprising:
    a push/pull control chip having a first output terminal and a second output terminal, said first and second output terminals separately outputting a first control signal and a second control signal both with a duty cycle smaller than 50%;
    a first switch coupling to said first output terminal of said push/pull control chip;
    a first SCR switch having a gate coupling to said first switch and an anode coupling to said DC power;
    a first N-MOS having a gate coupling to a cathode of said first SCR switch and a drain coupling to said DC power and a source coupling to one terminal of said first side of said transformer;
    a second N-MOS having a gate coupling to said first output terminal of said push/pull control chip via a first buffer circuit and a drain coupling to said source of said first N-MOS and a source coupling to a reference terminal;
    a second switch coupling to said second output terminal of said push/pull control chip;
    a second SCR switch having a gate coupling to said second switch and an anode coupling to said DC power;
    a third N-MOS having a gate coupling to a cathode of said second SCR switch and a drain coupling to said DC power and a source coupling to another terminal of said first side of said transformer; and
    a fourth N-MOS having a gate coupling to said second output terminal of said push/pull control chip via a second buffer circuit and a drain coupling to said source of said third N-MOS and a source coupling to said reference terminal.

2. The full bridge inverter as claimed in claim 1, wherein said DC power provides a positive DC power through conduction of said first N-MOS and said fourth N-MOS for said transformer to form a positive half-cycle of driving.

3. The full bridge inverter as claimed in claim 1, wherein said DC power provides a negative DC power through conduction of said second N-MOS and said third N-MOS for said transformer to form a negative half-cycle of driving.

4. The full bridge inverter as claimed in claim 1, wherein said first buffer circuit comprises:
    a first accelerating diode having a negative (N) terminal coupling to said first output terminal of said push/pull control chip and a positive (P) terminal coupling to said first switch;
    a first resistor parallel coupling to said first accelerating diode;
    a second accelerating diode having a negative (N) terminal coupling to said first output terminal of said push/pull control chip and a positive (P) terminal coupling to said gate of said second N-MOS; and
    a second resistor parallel coupling to said second accelerating diode.

5. The full bridge inverter as claimed in claim 1 wherein said second buffer circuit comprises:
    a third accelerating diode having a negative (N) terminal coupling to said second output terminal of said push/pull control chip and a positive (P) terminal coupling to said second switch;
    a third resistor parallel coupling to said third accelerating diode;
    a fourth accelerating diode having a negative (N) terminal coupling to said second output terminal of said push/pull control chip and a positive (P) terminal coupling to said gate of said fourth N-MOS; and
    a fourth resistor parallel coupling to said fourth accelerating diode.

6. The full bridge inverter as claimed in claim 1 further comprising a first capacitor, wherein said first capacitor is coupled between said gate and said source of said first N-MOS.

7. The full bridge inverter as claimed in claim 1 further comprising a second capacitor, wherein said second capacitor is coupled between said gate and said source of said third N-MOS.

8. The full bridge inverter as claimed in claim 1, wherein said first SCR switch is effectively formed by coupling a pnp transistor and an npn transistor.

9. The full bridge inverter as claimed in claim 1, wherein said second SCR switch is effectively formed by coupling a pnp transistor and an npn transistor.

10. The full bridge inverter as claimed in claim 1, wherein said first switch is a light-coupled switch.

11. The full bridge inverter as claimed in claim 10, wherein said first buffer circuit comprises:

a first resistor coupling to said first switch and said first output terminal of said push/pull control chip;

a second accelerating diode having a negative (N) terminal coupling to said first output terminal of said push/pull control chip and a positive (P) terminal coupling to said gate of said second N-MOS; and a second resistor parallel coupling to said second accelerating diode.

12. The full bridge inverter as claimed in claim 1, wherein said second switch is a light-coupled switch.

13. The full bridge inverter as claimed in claim 12, wherein said first buffer circuit comprises:

a third resistor coupling to said second switch and said second output terminal of said push/pull control chip;

a fourth accelerating diode having a negative (N) terminal coupling to said second output terminal of said push/pull control chip and a positive (P) terminal coupling to said gate of said fourth N-MOS; and a fourth resistor parallel coupling to said fourth accelerating diode.

14. A full bridge inverter connected to a first side of a transformer and converting a DC power to an AC power, said full bridge inverter comprising:

a push/pull control chip having a first output terminal and a second output terminal, said first and second output terminals separately outputting a first control signal and a second control signal both with a duty cycle smaller than 50%;

a first driver coupling to said first output terminal of said push/pull control chip and said DC power, and receiving said first control signal;

a second driver coupling to said second output terminal of said push/pull control chip, and receiving said second control signal; and a full bridge switch assembly composed of four N-MOSes, said full bridge switch assembly coupling to said DC power, said first driver, said second driver and said transformer, and converting said DC power into an AC power by said first driver and said second driver, and said AC power being transmitted to two terminals of a first side of said transformer.

15. The full bridge inverter as claimed in claim 14, wherein said first driver comprises:

a first buffer circuit coupling to said first output terminal of said push/pull control chip and said full bridge switch assembly;

a first switch coupling to said first output terminal of said push/pull control chip via said first buffer circuit; and a first SCR switch having a gate coupling to said first switch and an anode coupling to said DC power and a cathode coupling to said full bridge switch assembly.

16. The full bridge inverter as claimed in claim 15, wherein said first buffer circuit comprises:

a first accelerating diode having a negative (N) terminal coupling to said first output terminal of said push/pull control chip and a positive (P) terminal coupling to said first switch;

a first resistor parallel coupling to said first accelerating diode;

a second accelerating diode having a negative (N) terminal coupling to said first output terminal of said push/pull control chip and a positive (P) terminal coupling to said gate of said second N-MOS; and a second resistor parallel coupling to said second accelerating diode.

17. The full bridge inverter as claimed in claim 15, wherein said first switch is a light-coupled switch.

18. The full bridge inverter as claimed in claim 17, wherein said first buffer circuit comprises:

a first resistor coupling to said first switch and said first output terminal of said push/pull control chip;

a second accelerating diode having a negative (N) terminal coupling to said first output terminal of said push/pull control chip and a positive (P) terminal coupling to said gate of said second N-MOS; and a second resistor parallel coupling to said second accelerating diode.

19. The full bridge inverter as claimed in claim 14, wherein said second driver comprises:

a second buffer circuit coupling to said second output terminal of said push/pull control chip and said full bridge switch assembly;

a second switch coupling to said second output terminal of said push/pull control chip via said second buffer circuit; and a second SCR switch having a gate coupling to said second switch and an anode coupling to said DC power and a cathode coupling to said full bridge switch assembly.

20. The full bridge inverter as claimed in claim 19, wherein said second buffer circuit comprises:

a third accelerating diode having a negative (N) terminal coupling to said second output terminal of said push/pull control chip and a positive (P) terminal coupling to said second switch;

a third resistor parallel coupling to said third accelerating diode;

a fourth accelerating diode having a negative (N) terminal coupling to said second output terminal of said push/pull control chip and a positive (P) terminal coupling to said gate of said fourth N-MOS; and a fourth resistor parallel coupling to said fourth accelerating diode.

21. The full bridge inverter as claimed in claim 19, wherein said second switch is a light-coupled switch.

22. The full bridge inverter as claimed in claim 21, wherein said second buffer circuit comprises:

a third resistor coupling to said second switch and said second output terminal of said push/pull control chip;

a fourth accelerating diode having a negative (N) terminal coupling to said second output terminal of said push/pull control chip and a positive (P) terminal coupling to said gate of said fourth N-MOS; and a fourth resistor parallel coupling to said fourth accelerating diode.

* * * * *